United States Patent [19]

Fletcher et al.

[11] 4,051,834
[45] Oct. 4, 1977

[54] PORTABLE, LINEAR-FOCUSED SOLAR THERMAL ENERGY COLLECTING SYSTEM

[76] Inventors: James C. Fletcher, Administrator of the National Aeronautics and Space Administration, with respect to an invention of; Charles G. Miller, Pasadena; Jens G. Pohl, San Luis Obispo, both of Calif.

[21] Appl. No.: 680,939

[22] Filed: Apr. 28, 1976

[51] Int. Cl.$^2$ ............................................... F24J 3/02
[52] U.S. Cl. ................................... 126/271; 237/1 A; 350/293; 350/299
[58] Field of Search ............... 126/270, 271; 237/1 A; 350/293, 299; 165/49

[56] References Cited

U.S. PATENT DOCUMENTS

| | | | |
|---|---|---|---|
| 3,125,091 | 3/1964 | Sleeper, Jr. | 126/271 |
| 3,227,153 | 1/1966 | Godel et al. | 126/271 |
| 3,994,277 | 11/1976 | Altman | 126/270 |

*Primary Examiner*—Kenneth W. Sprague
*Assistant Examiner*—James C. Yeung
*Attorney, Agent, or Firm*—Monte F. Mott; Wilfred Grifka; John R. Manning

[57] ABSTRACT

A solar heat collection system is provided by utilizing a line-focusing device that is effectively a cylindrically curved concentrator within a protected environment formed by a transparent inflatable casing. A target, such as a fluid or gas carrying conduit is positioned within or near the casing containing the concentrator, at the line focus of the concentrator. The casing can be inflated at the site of use by a low pressure air supply to form a unitary light-weight structure. When deflated, the collector, including casing, concentrator and target, is readily transportable.

A system constructed from a plurality of such line-focusing devices can be used either at ground level or on rooftops. A system may advantageously utilize a plurality of parallel aligned heat absorbing rigid conduits as targets, each conduit supporting an inflatable concentrator and casing. In particular cases the inflatable concentrator can be replaced with a rigid metal or other concentrator while maintaining the novel advantages of the whole solar heat collection system. The concentrator is supported in a manner that facilitates its manual movement in order to track the sun's movement, thereby keeping the line focus of the concentrator on the target.

12 Claims, 17 Drawing Figures

FIG_1

FIG_8

PORTABLE, LINEAR-FOCUSED SOLAR THERMAL ENERGY COLLECTING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The present invention relates to solar energy collection systems and more particularly to linear-focused solar thermal energy collecting systems wherein the collector and indeed, the entire system, is collapsible and may be easily stored or moved to another location.

In the field of solar thermal energy collection, much effort has been expended to devise an efficient and economical solar thermal energy concentrator. Permanent installations utilize relatively expensive structures and installation methods. Nevertheless, the cost of the systems appears to be justifiable because it is amortized over the long lifetime of the system.

Frequently a need arises for a temporary solar energy collection system. Installing a system that utilizes expensive structures and installation methods cannot be justified on a temporary basis. Situations such as meeting peak requirements, farm and agricultural drying, supplying space heat or hot water, preheating combustion air as a means for effecting fuel savings, and heat at remote construction sites are some of the examples of where temporary solar thermal energy collection systems may be utilized to great advantage.

Portable solar thermal energy collectors of the inflatable type have been suggested. An example of an inflatable solar thermal energy collector can be found in U.S. Pat. No. 3,125,091 issued to H. T. Sleeper, Jr. on Mar. 17, 1964.

These systems, as exemplified by the Sleeper patent are still too expensive for the amount of heat they produce. The Sleeper inflatable collector, for example, besides a reflecting concentrator utilizes a concentrator lens as an integral part of the collector, thereby substantially increasing the manufacturing cost of the collector.

SUMMARY OF THE INVENTION

The objects and the general purpose of this invention are accomplished in the following manner. A line-focusing concentrator is housed within a transparent plastic cylinder. The concentrator may simply be a reflective coating applied to part of the inner surface of the cylinder. A target, such as a heat absorbing conduit is situated at the line focus of the concentrator. The collector is set up for operation by inflating the concentrator housing to a rigid working state by a low pressure air source. The target may be an integral part of the concentrator structure. The inflated concentrator may rest on the ground or be suspended. In particular cases the inflatable concentrator can be replaced with a rigid metal or other type while maintaining the novel advantages of the herein described collector system. A collector system may advantageously utilize a target such as rigid heat-absorbing conduit which is separate from the concentrator to support the concentrator. The concentrator is suspended in a manner that permits occasional manual movement in order to track the sun and thereby keep the line-focus of the concentrator on the target, regardless of the latitude and month of the year.

A variety of inflatable shapes for the concentrator housing are provided to optimize the collection of thermal solar energy, trading off operating efficiency and manufacturing cost.

BRIEF DESCRIPTION OF THE DRAWINGS

Other objects and many of the attendant advantages of this invention will be readily appreciated as the same becomes better understood by reference to the following detailed description when considered in conjunction with the accompanying drawings, in which like reference numerals designate like parts throughout the figures thereof and wherein.

DESCRIPTION OF THE PREFERRED EMBODIMENTS

Figure 1:
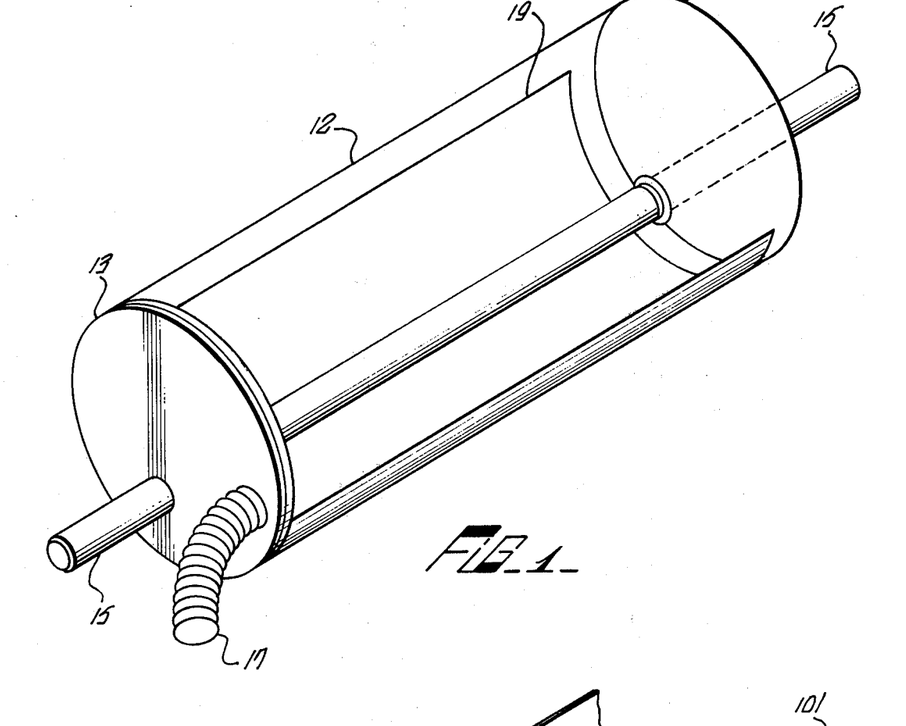
FIG. 1 is a perspective illustration of an inflatable linear-focused solar thermal energy collector according to the present invention.

An inflatable linear-focusing thermal energy collector for use in a collecting system according to the present invention is illustrated in FIG. 1 as comprising a cylinder 12, having a circular cross section. The cylinder is terminated at both ends by rigid circular end pieces 13 that are sealed to the cylinder 12. The cylinder 12 is preferably made from transparent plastic film such as the well-known plastic films of polyethylene or polyvinylchloride (PVC). A portion 19 of the inner surface of the plastic cylinder 12 is covered with a reflecting material that could be aluminized Mylar or simply an aluminum coating applied directly to the film. This reflecting material conforms to the curvature of the cylinder and forms the linear concentrator. A target such as a conduit 15 containing a heat absorbing fluid such as water or a heat absorbing gas such as air passes through cylinder 12 and is supported by the end pieces thereof at the line focus of the cylindrical reflecting surface 19. The conduit 15 is preferably made of heat resistant polymeric tubing.

An air intake valve, or a tube 17 containing a valve therein permits air to be pumped into the cylinder 12 to inflate it to its illustrated operating condition. The conduit 15 is sealed to the end pieces of the concentrator, thereby providing a sealed environment for the concentrator 19. Having a sealed collector unit also permits its inflation by means of a low pressure pumping device. The conduit 15 may carry water or air through the concentrator, along the length of the concentrator 19. If the relation of the conduit 15 to the concentrator 19 is a displaced distance between the two which is equal to one-half the radius of the curvature of the concentrator 19, the approximate location of the line focus of the concentrator 19, the fluid or gas in the conduit may reach a temperature of 212° F.

Figure 2:
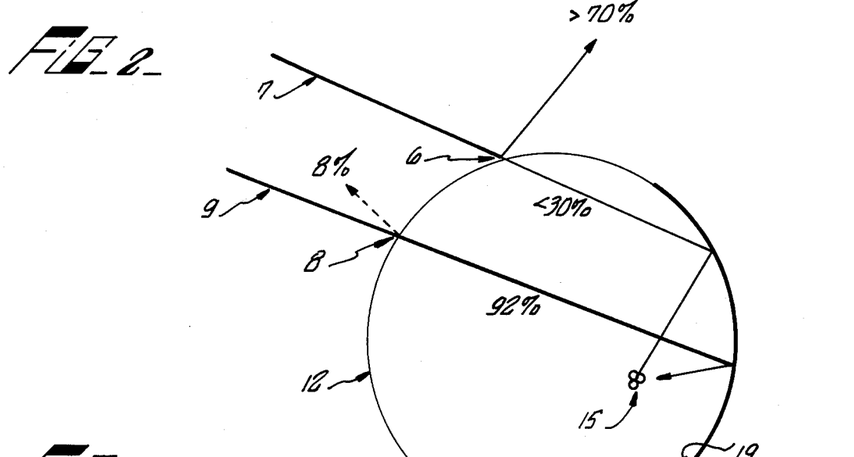
FIG. 2 is a schematic illustration of the focusing of light rays to a line focus in the embodiment of FIG. 1.

While the arrangement of the components just described, as also shown schematically in FIG. 2, has been tested and proven to operate satisfactorily, there are some modifications that can increase the efficiency that are here described. It can be seen from FIG. 2 that when a ray 9 penetrates the transparent cylinder wall at point 8, nearly normal to the surface, that about 92% of the incident energy penetrates the transparent wall, while 8% is unavoidably reflected away and cannot contribute to the heat collected by the fluid in conduit 15. However, ray 7, which penetrates the transparent cylinder at point 6, strikes the surface at an angle which is more oblique, i.e., further from the normal than was ray 9. Therefore, by Fresnel's law, the reflection coefficient, and hence the reflection loss may be very large. In the case of the ray 7 the loss is over 70%. Thereby less than 30% of the energy from ray 7 is available for eventual absorption by the fluid conduit 15.

Figures 3, 9:
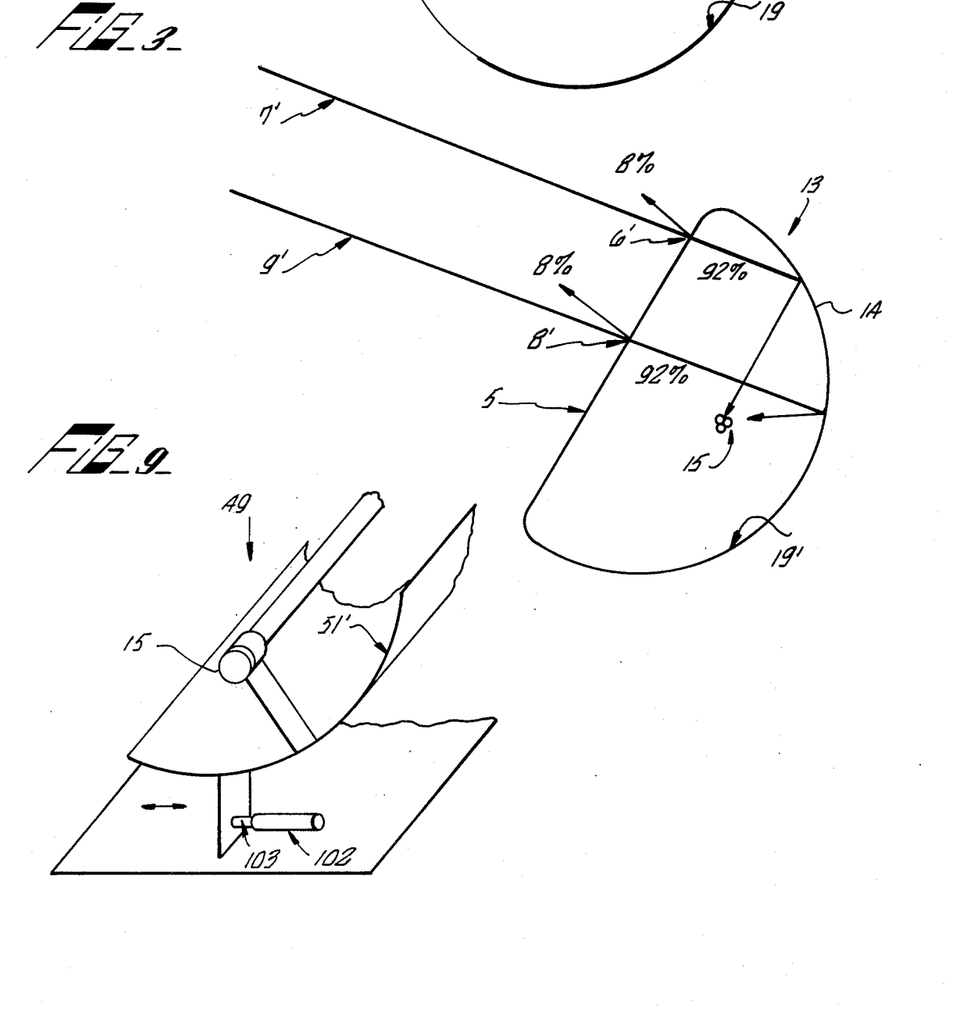
FIG. 3 is a schematic illustration of the focusing of light rays to a line focus in an alternate embodiment.
FIG. 9 is a schematic of the embodiment of FIG. 8, partially modified.

This deficiency can be partially remedied if the transparent cylinder 12 is terminated at both ends by rigid end-pieces that have a shape which is not circular, but rather conform to the outline 13 shown in FIG. 3. For inflated plastic casings that have end-pieces of the shape 13 shown in FIG. 3, the sun-facing portion 5 will be somewhat flattened in the vicinity of the end-pieces, or any intermediate restraining pieces, and will tend to become rounded at points furthest from the end or restraining pieces. Thus, for casings with modified end-pieces of the shape 13, shown in FIG. 3, solar rays that enter the casing, two of which are shown as 9' and 7', strike at angles which are more nearly normal to the transparent surface. Under these circumstances, the net input to the conduit 15 is markedly increased.

An additional advantage can be gained, if the rigid end-pieces having a shape 13 as shown in FIG. 3 have a shape that departs, on the curved portion 14, from a circular section. If the curved part 14 of the rigid end-pieces has the shape of a suitably chosen parabola, some of the loss otherwise due to spherical aberration affecting the edge rays 7' will be avoided, particularly in the vicinity of the restraining end-pieces.

An alternate embodiment (FIG. 4) of a thermal energy collector according to the present invention, includes a cylindrical casing 20 of a thin film plastic material such as PVC. The casing is transparent for most of its perimeter on both sides 21 of a target such as a fluid carrying conduit 15. A light-reflecting surface 25 such as aluminized Mylar is contained within and conforms to the curvature of the casing 20 directly opposite the location of the fluid conduit 15. This reflecting surface 15 forms the solar energy concentrator. The conduit 15 is attached to the casing 20 along its longitudinal axis so that the conduit is contained within. The conduit 15 is caused to lie along the line focus of the concentrator 25 by adjusting the air pressure within the casing. The ends of the casing 20 may consist of solid pre-formed pieces that determine the shape of the casing when inflated or may simply be sealed by seaming.

Figures 4, 5, 6, 7:
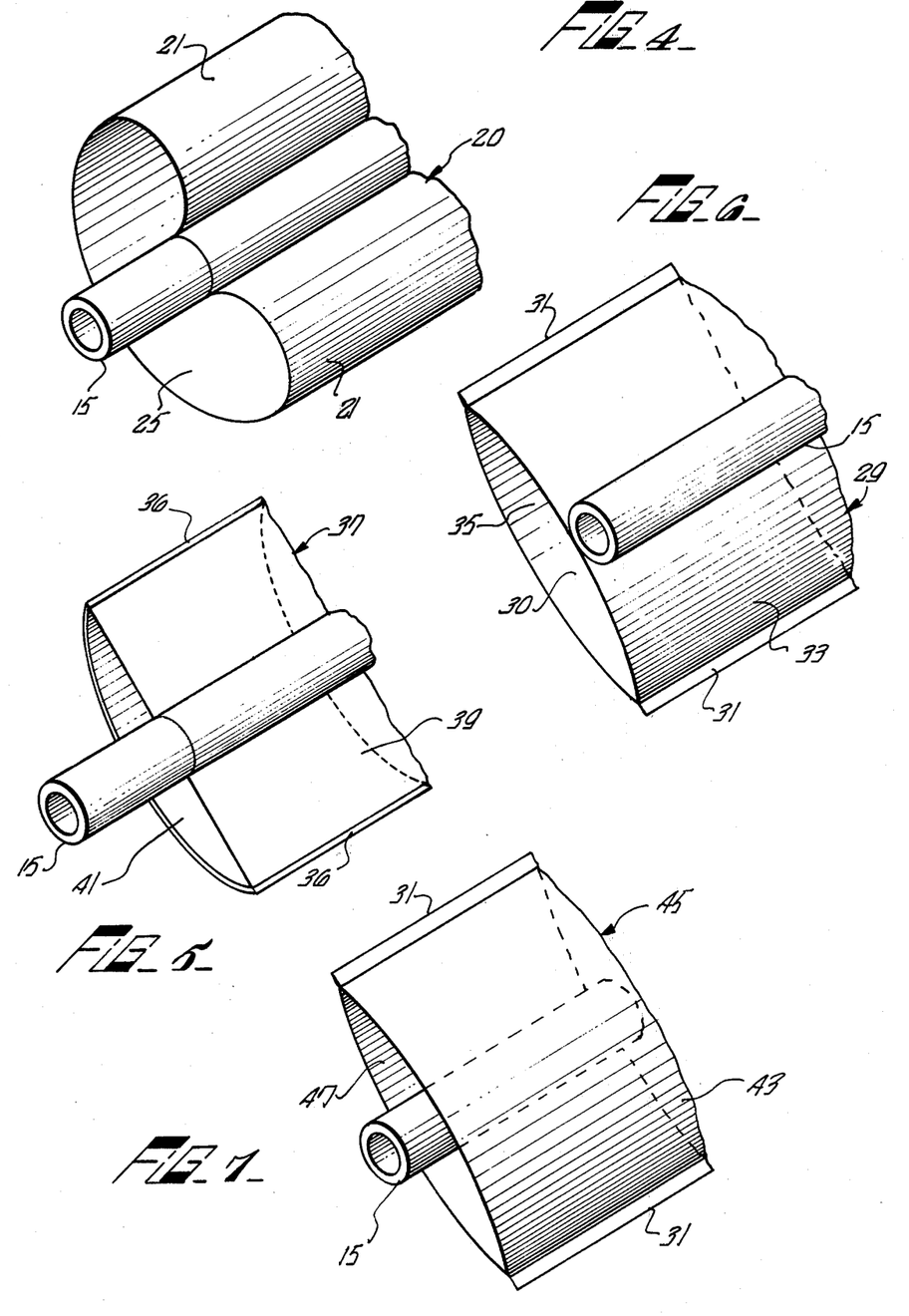
FIG. 4 is a partial perspective illustration of another embodiment of an inflatable collector according to the present invention.
FIG.5 is a partial perspective of another embodiment of an inflatable collector according to the present invention.
FIG. 6 is a partial perspective of another alternate embodiment of an inflatable collector according to the present invention.
FIG. 7 is a partial perspective of an alternate embodiment of an inflatable collector according to the present invention.

An alternate embodiment of a collector is illustrated in FIG. 5 wherein a casing 37 is shown to be made of two distinct segments 39 and 41 of material seamed together along their extended ends. The material 39 is a transparent thin film plastic, such as polyvinylchloride. This material also supports a conduit 15 that carries the heat absorbing fluid. The conduit is attached to the transparent plastic 39 so as to be internal to the formed casing. The other segment 41 of the casing is a reflecting material that forms the concentrator. Such a material may be aluminized Mylar, for example. The two segments 39 and 41 of the casing are seamed together along their longitudinal ends 36. The segment 41 is wider than the segment 39 so that when inflated the casing assumes the shape of a portion of a circular cylinder, or even of a low profile non-circular cylinder, depending on the width of segment 41.

The thermal energy collector 29 illustrated in FIG. 6 is also made from a pair of segments 33 and 35, wherein one of the segments 33 is a transparent thin film plastic and the other segment 35 is a light reflecting material such as aluminized Mylar. The two segments are approximately equal in width and are seamed together along their extended edges 31 to form a casing 29 within which a reflecting surface 30 of the segment 35 is contained. A fluid conducting conduit 15 which is made of heat resistant plastic is attached to the transparent segment 33 so that it is located exterior to the casing. The perpendicular distance between the fluid conducting conduit 15 and the reflecting surface 33 of the segment 35 of the casing is dictated by the degree of inflation of the casing. The distance between the concentrating segment 35 and the conduit is preferably one-half the radius of curvature of segment 35.

By mounting the fluid conducting conduit 15 exterior to the casing 29, the transparent segment 33 of the casing must be a heat resistant plastic. In order to avoid utilizing a high temperature tolerant plastic, the fluid conducting conduit 15 may be mounted interior to the casing, as shown in FIG. 7, for collector 45. The conduit is attached to the internal side of the transparent film segment 43 of collector 45. Here again, the distance between the reflecting surface segment 47 and the conduit 15 is controlled by the degree of inflation.

Figure 8:
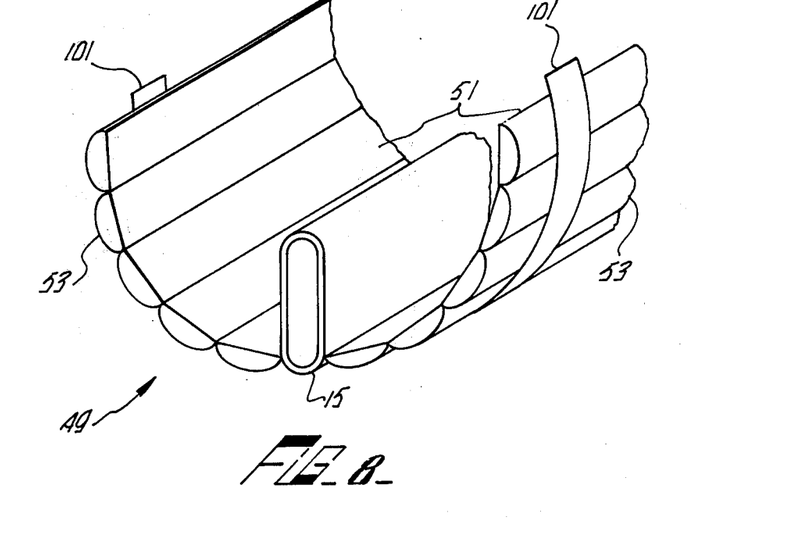
FIG. 8 is a partial perspective of another alternate embodiment of an inflatable collector according to the present invention.

An alternate solar energy collector 49 according to the present invention which provides for a degree of accommodation to the varying elevations of the sun as the hours and seasons change is illustrated in FIG. 8. A conduit 15 is connected to a pair of reflecting members 51 which are inflatable. Each reflecting member is made up of a plurality of inflatable casings 53 which have a curved and flat side, the flat side of each casing being coated with a reflecting material. Each casing is individually inflatable. The degree of inflation of the various casings determines the relative direction of its respective reflecting surface. The conduit 15, as shown in FIG. 8, is preferably elongated in a direction perpendicular to the central casing of the assembly. A support strap, 101, and similar straps at various locations as needed along the length of the assembly, serve as attachment points and as solid backing for the inflation of the segments 53 as they are inflated by varying pressures, as needed.

If the target, such as conduit 15 is fixed, as shown in FIG. 9, any necessary seasonal and hourly adjustment that needs to be made to the collector 49 may be made by means of pneumatic cylinders and piston devices 102 and 103 to change the relative angle of the concentrator 51'.

Figure 10:
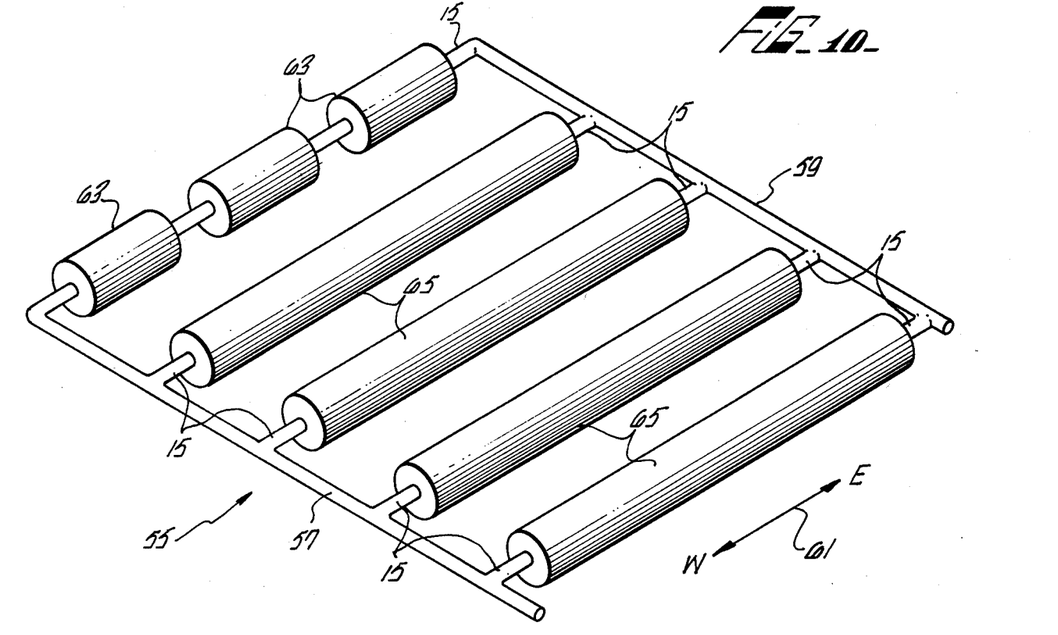
FIG. 10 is an illustration of a plurality of collectors connected together according to the present invention, to form a collector system.

The previously described collectors are advantageously utilizable in a collector system 55 wherein a plurality of like or different collectors are connected together to form the system of FIG. 10. The extended longitudinal axis (the axis of conduits 15) are preferably directed along an east-west direction 61 in order to require the least frequent adjustment of the orientation of the concentrators about their respective target conduits 15. An intake manifold 57 connects one end of all the conduits 15 of the respective collectors 63 and 65. The other ends of the conduits 15 are connected to an exhaust manifold 59. A heat absorbing medium is supplied to the system 55, through the intake manifold 57, warmed up by the concentrator and then removed from the system by the exhaust manifold 59 and transmitted to a utilization source.

The collector system 55 may consist of a combination, as shown in FIG. 10, of collectors 63 connected in tandem, this tandem interconnection of collectors being connected in parallel with other tandem or single parallel collectors 65. The mixing of a variety of collectors according to the present invention, as previously described, is a matter of design choice depending upon the environmental conditions under which the entire collector system 55 is to operate. It should be remembered, however, that the collector system 55 is easily disassembled, transportable to a new location and reassembled.

Figure 11A:
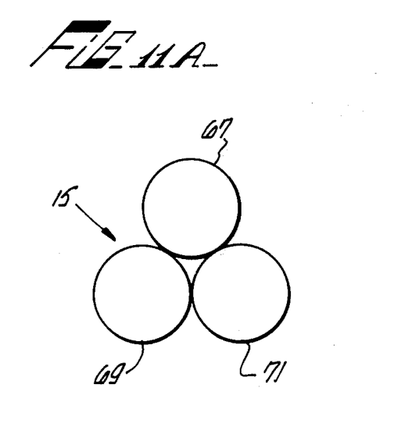
FIG. 11A is an end view of a cluster of heat absorbing conduits used in the present invention.
Figure 11B:
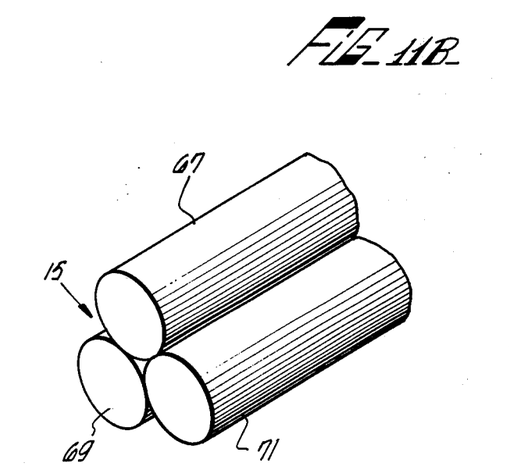
FIG. 11B is a side elevation of the clustered heat absorbing conduits used with the present invention.
Figure 11C:
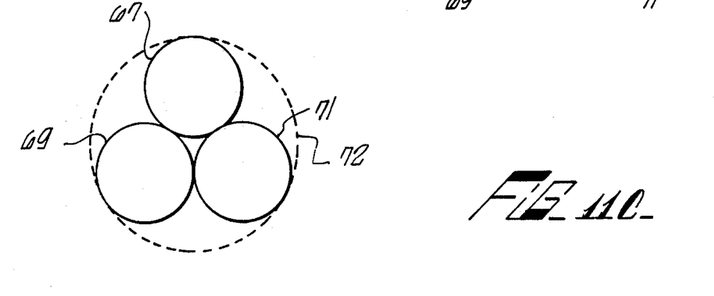
FIG. 11C is a schematic of the cluster of heat absorbing conduits in relation to a single conduit of equal capacity.

The conduit 15 used for the heat absorbing medium is preferably made of a bundle of three conduits, 67, 69 and 71, which together have a combined circumference that would have been equal to the circumference of a single conduit if used. A cluster of three conduits is preferred over a single conduit for the reason that a cluster of three conduits at the line focus of a linear concentrator is capable of more efficient operation, in that it absorbs more thermal energy and re-radiates less thermal energy than a single conduit of a comparable size. A comparable size single conduit 72 would have a diameter that would encompass the cluster.

Figure 12:
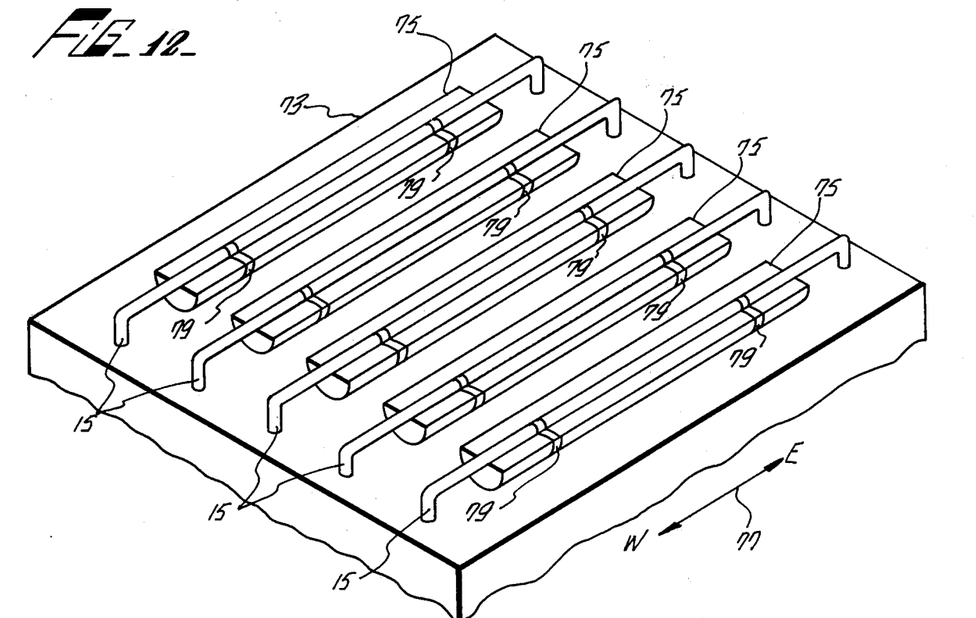
FIG. 12 is a perspective illustration of an alternate embodiment of an energy collecting system.

A solar thermal energy collector system which has the qualities of light weight and portability is illustrated in FIG. 12, as a series of parallel concentrators 75 having their respective target conduits 15 oriented in an east-west direction 77. The solar energy concentrators 75 of the system are suspended from their respective conduits 15. The intake and output ends of the conduits 15 may be connected to intake manifolds and exhaust manifolds (not shown) below the surface or roofline 73. Each of the concentrators 75 is suspended from its respective conduit 15 by a plurality of suspending devices 79 which will be more fully described hereinafter. The concentrators 75 are constructed to be inflatable according to the principles of the present invention.

Figure 13:
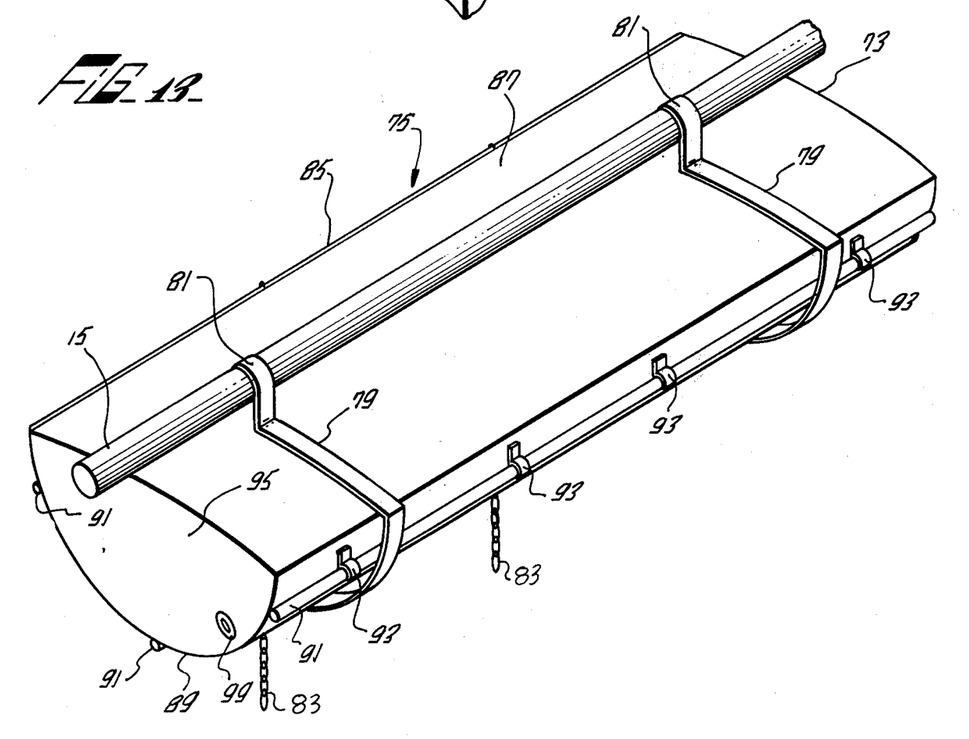
FIG. 13 is a perspective illustration of a thermal energy collector according to the present invention.

The linear-focused solar energy concentrator 75 used in the system of FIG. 12 is shown in FIG. 13 as consisting of a two segment casing wherein the first segment 87 of the casing is transparent and the second segment 89 of the casing is a plastic, such as aluminized Mylar, that has a light reflecting surface. The casing is inflated by a low pressure air source through a valve 99, and may be stoppered. The ends 95 of the casing may be rigid or flexible. Either way, they are sealed by appropriate seams, thereby creating an environment for the reflecting surface of segment 89, within the casing, which is free from wind, dust and the other deteriorating elements in the atmosphere.

The casing may be stiffened by a plurality of rods 91 that are slipped into retainers 93 along the extended end of the casing. One edge 85 of the casing is stiffened by appropriate means such as a strip of plywood or other appropriate stiffening material to which chains or other such appropriate means 83 are fastened.

Figure 14A:
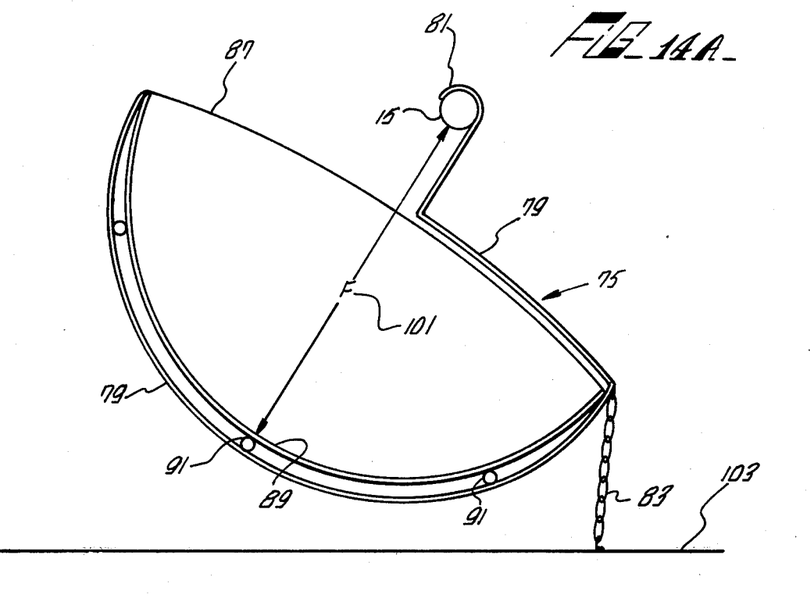
FIG. 14A is an end elevation of the energy collector of FIG. 10 in a first operating position.

The solar concentrator is suspended from its heat-absorbing conduit by suspending devices 79 which partially wrap around the underside of the concentrator casing, conforming to its curvature. The suspending means 79 operates very similar to a coat hanger. Two or more alternate angular positions for the linear focusing concentrator are provided by varying the length of the chain 83 while the concentrator swings about the fixed conduits 15. This allows the concentrator to track, to a satisfactory extent, the movement of the sun. Referring first to FIG. 14A, it can be seen that the linear focusing concentrator is suspended from its heat-absorbing conduit 15 by the hook 81. The hook is placed such that the distance 101 between the reflecting surface of segment 89 and the target pipe 15 is preferably about half the radius of curvature of the concentrator which is segment 89.

The position of the concentrator 75 illustrated in FIG. 14A is the position that it would be situated at during most of the season from February to May and from July to October, i.e., for a period of time before and after the spring and autumn equinoxes, at mid-latitudes such as 30°–40° N. Latitude. It can be seen that the supporting hook 81 attached to the casing along with the chain 83 maintains the casing suspended and not touching the installation surface 103.

Figure 14B:
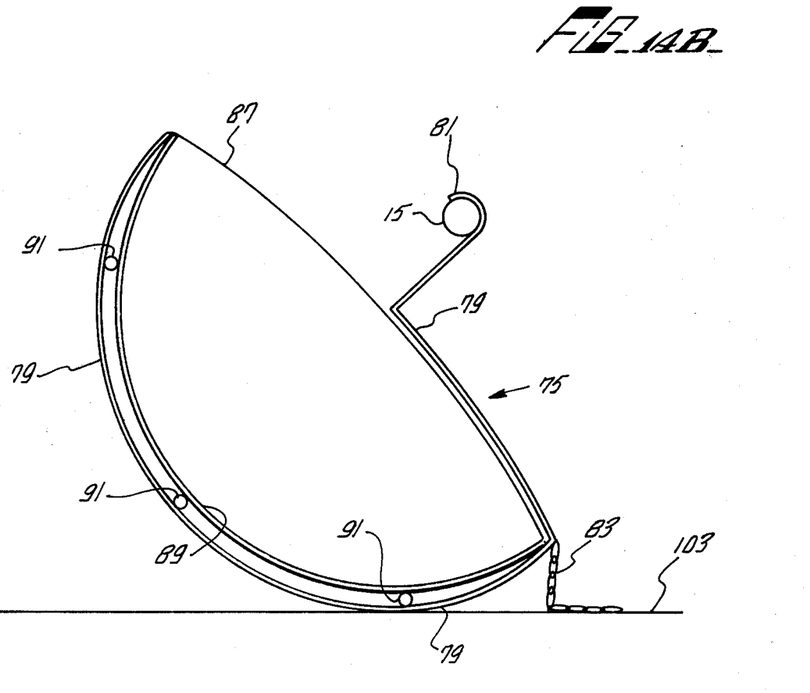
FIG. 14B is an end elevation of the collector of FIG. 10 in a second operating position.

Referring now to FIG. 14B, the linear-focusing thermal energy concentrator 75 is shown as being suspended by the hook 81, but tilted at a much greater angle by means of shortening the chain 83. This is the position that is necessary to accept the sun's energy efficiently during the period before and after the winter solstice in the northern hemisphere, when days are short, solar intensity less, and the greatest efficiency is needed to gather solar energy.

While in principal a third position, which could be gotten by using a longer chain than that suitable for the equinox position of FIG. 14A would be most efficient for the months from May to July, i.e., from before to after the summer solstice, in practice this would not in general be needed. This is because a collector sized to be satisfactory for the FIG. 14B position during the weak winter heat input, would give enough heat from the intense summer sunlight acting on the collector at an angle optimized for the equinoctal period, shown in FIG. 14A, to equal or surpass its winter heat input.

What has been disclosed is a low cost portable linear-focusing solar energy collecting system in various configurations that have the characteristics of low cost and light weight at an efficiency that make them extremely useful for temporary, mobile, or supplementary installation. Obviously many modifications and variations of the present invention are possible in light of the above teachings. It is therefore to be understood that within the scope of the appended claims, the invention may be practiced otherwise than as specifically described.

What is claimed is:

1. An inflatable linear solar thermal energy collector comprising:
   an extended casing of plastic material having both ends thereof sealed, a section of said casing being transparent;
   a valve means attached to said casing for admitting a gas into said casing to inflate it;
   a reflecting surface having a cylindrical surface of curvature contained within said casing;
   rigid means attached to said casing for supporting said casing, when inflated, in a suspended manner, said rigid means being adapted to removably attach to a supporting member;
   a conduit means extending the length of said casing for supporting said casing by said rigid means; and
   means for maintaining one edge along the length of said casing at a fixed perpendicular distance from said conduit means.

2. The thermal energy collector of claim 1 wherein said casing is made of transparent plastic material in the form of a half-cylinder cross-section, the internal cylindrical portion thereof being coated with a reflecting material.

3. The thermal energy collector of claim 2 wherein said edge maintaining means maintains the cylindrical portion of said casing at a distance from said conduit means along a line perpendicular to the curved portion of said casing and said conduit means that equals one-half the radius of curvature of the curved portion.

4. The thermal energy collector of claim 3 wherein said rigid means includes means for varying the angle that the line perpendicular to said casing and said conduit means makes with a horizontal plane.

5. The thermal energy collector of claim 4 wherein said varying means has two or more positions.

6. The thermal energy collector of claim 2 wherein said rigid means has supporting arms that conform to the shape of said casing along its curved portion.

7. An inflatable linear solar thermal energy collecting system, comprising:
   a plurality of conduit means, each conduit carrying a heat absorbing material therein;
   a plurality of inflatable linear concentrators suspended from said plurality of conduit means, each concentrator comprising:
   a. an extended casing of plastic material having both ends thereof sealed, a section of said casing being transparent;
   b. a valve means attached to said casing for admitting a gas into said casing to inflate it;
   c. a reflecting surface having a surface of curvature contained within said casing;
   d. rigid means attached to said casing for supporting said casing when inflated, said rigid means being adapted to removably attach to the conduit means;
   e. means for maintaining one edge along the length of said casing at a fixed perpendicular distance from said conduit means;
   inlet means connected to the ends of each of said plurality of conduit means; and
   outlet means connected to the other end of each of said plurality of conduit means.

8. The thermal energy collecting system of claim 7 wherein said casing is made of transparent plastic film material having a partial cylinder cross-section, the internal curved portion thereof being coated with a reflecting material.

9. The thermal energy collecting system of claim 8 wherein said edge maintaining means maintains the curved portion of said casing at a distance from said conduit means along a line perpendicular to said casing and said conduit means that equals one-half the radius of curvature of the curved portion.

10. The thermal energy collecting system of claim 9 wherein said rigid means includes means for varying the angle that the line perpendicular to said casing and said conduit means make with a horizontal plane.

11. The thermal energy collecting system of claim 10 wherein said varying means has two or more positions.

12. The thermal energy collecting system of claim 8 wherein said rigid means has supporting arms that conform to the shape of said casing along its curved portion.

* * * * *